United States Patent [19]

Saleeb et al.

[11] Patent Number: 4,622,227

[45] Date of Patent: Nov. 11, 1986

[54] ACIDULENT COMPRISING FUMARIC ACID AND DRIED NATURAL JUICE SOLIDS

[75] Inventors: Fouad Z. Saleeb, Pleasantville, N.Y.; Randal P. McKay, Paramus, N.J.

[73] Assignee: General Foods Corporation, White Plains, N.Y.

[21] Appl. No.: 769,513

[22] Filed: Aug. 26, 1985

[51] Int. Cl.$^4$ .............. A23L 1/22; A23L 1/223; A23L 1/235

[52] U.S. Cl. .................. 426/96; 426/590; 426/591; 426/599; 426/650; 426/576

[58] Field of Search .......... 426/650, 590, 96, 591, 426/599, 576

[56] References Cited

U.S. PATENT DOCUMENTS

| | | | |
|---|---|---|---|
| 1,594,804 | 8/1926 | Welch | 426/96 |
| 2,567,038 | 9/1951 | Stevens et al. | 426/599 |
| 2,834,687 | 5/1958 | Swisher | 426/599 |
| 2,855,315 | 10/1958 | Perrozzi et al. | 426/96 |
| 2,970,058 | 1/1961 | Nobile | 426/590 |
| 3,011,894 | 12/1961 | Block et al. | 426/590 |
| 3,152,909 | 10/1964 | Raffensperger et al. | 426/96 |
| 3,245,798 | 4/1966 | Van Ness | 426/96 |
| 3,250,624 | 5/1966 | Van Ness | 426/96 |
| 3,328,173 | 6/1967 | Van Ness et al. | 426/590 |
| 3,395,021 | 7/1968 | Glicksman et al. | 426/590 |
| 4,104,414 | 8/1978 | Rahman | 426/599 |

FOREIGN PATENT DOCUMENTS

| | | | |
|---|---|---|---|
| 3009810 | 11/1961 | U.S.S.R. | 426/590 |
| 3370956 | 2/1968 | U.S.S.R. | 426/96 |

*Primary Examiner*—Jeanette Hunter
*Attorney, Agent, or Firm*—Thomas A. Marcoux; Richard D. Schmidt; Daniel J. Donovan

[57] ABSTRACT

The invention describes a wettable and soluble acidulent comprising fumaric acid and natural juice solids. The fumaric acid is employed in amounts of at least 50% by weight of the acidulent and the natural juice solids are employed in amounts of at least 5% by weight. The acidulent may additionally contain a sweetener employed in amount of at least 2% by weight.

21 Claims, No Drawings

ACIDULENT COMPRISING FUMARIC ACID AND DRIED NATURAL JUICE SOLIDS

BACKGROUND OF THE INVENTION

1. Field of the Invention

This invention pertains to an acidulent comprising fumaric acid and dry natural juice solids which may be used in powdered soft drinks and desserts.

2. Description of the Prior Art

Acidulents are known to be used in foodstuffs and in particular are used in dry powdered beverages and dry powdered desserts to provide tartness to the beverage or dessert. The primary acidulent used is citric acid, a natural acid, which while providing a good tart taste is an expensive acidulent.

Fumaric acid, also a natural acid which is less expensive and more potent for imparting certain acid tastes than citric, has been taught to be used as an acidulent in foodstuffs. For example see *Encyclopedia of Chemical Technology*, 3rd Edition, Vol. 14, 1981 p. 770 and in the *Handbook of Food Additives* (1972) Chapter 5, "Acidulents in Food Processing" by William Hollet Gardner, Ph.D., p. 232. As further described in the *Handbook of Food Additives*, (supra) p. 235, however, fumaric acid is shown to have much lower levels of solubility than citric acid especially in cold water. Furthermore it is known that fumaric acid is not wettable and accordingly when added to a water, floats on the top and is difficult to get into solution. Therefore, fumaric acid has not been employed as an acidulent even though it has a lower cost than citric acid and it may be employed at lower use levels.

Attempts have been made to increase the solubility of fumaric acid. For example in *American Laboratory*, Vol. 15(4) (1983) in an article entitled "Solubility of Fumaric Acid", pp. 88–89, by William Gasser and Rodrick Stingleman, it is taught to increase the solubility of fumaric acid in water by coating the fumaric acid with dialkylesthers of sodium sulfo-succinate; coating with hydroxycarboxylic acids of 2 to 12 carbon atoms; or combining fumaric acid with a surfactant.

Also in U.S. Pat. No. 3,151,986 it is disclosed that fumaric acid having a maximum particle size of about 75 microns and coated with between about 0.1% and about 1.0% of di(2-ethyl-hexyl)-sodium sulfosuccinate, rapidly increases its solubility in cold water.

In U.S. Pat. No. 3,370,956 fumaric acid was dried with large amounts of acids (e.g. 25 to 75%) such as citric acid or smaller amounts of acids (e.g. 1% to 75%) in combination with 0.001% to about 0.7% of a film forming agent. The film forming agents are carbohydrates, water soluble gelatins, surfactants and dioctyl-sulfosuccinic acid and its salts.

In UK Patent Application GB No. 2 068 705 entitled Cold Water Soluble Fumaric Acid, fumaric acid is slurred with a low DE maltodextrin containing at least 75% by weight of polysaccharides above trisaccharide and the slurry is spray dried.

These attempts in the art to solve the problems associated with fumaric acid have resulted in combining a natural substance with an artificial substance and/or these solutions have not been entirely satisfactory in providing rapidly soluble fumaric acid.

Accordingly it is desired to find a method for increasing the wettability and solubility of fumaric acid in a cost effective manner and to do so without combining the fumaric acid with non-natural ingredients.

SUMMARY OF THE INVENTION

This invention pertains to an acidulent comprising fumaric acid and dried natural juice solids. It has been found when this invention is employed the wettability and solubility of fumaric acid is greatly increased in a cost-effective manner and the wettability and solubility of fumaric acid is increased by combining the fumaric acid with natural products.

DETAILED DESCRIPTION OF THE INVENTION

This invention pertains to a dried acidulent comprising fumaric acid and natural juice solids. The fumaric acid in the acidulent is employed in amounts of at least 50% and preferably from 50% to 95%. The natural juice solids are employed in amounts of at least 5% and preferably in amounts from 5% to 50%. The natural juice solids are obtained from a variety of sources including fruit juice solids and vegetable juice solids. The fruit juice solids are obtained from a wide variety of fruits which include grapefruit, pear, strawberry, lemon, orange and cranberry. Preferably the fruits are grapefruit and orange and most preferably the fruit is grapefruit alone or in combination with other juices. The vegetable juice solids are obtained from a wide variety of vegetables such as beets, broccholi and carrots.

The natural juice solids contain carbohydrates, proteins, lipids, natural colors, vitamins, volatile and nonvolatile flavors and organic and inorganic acids and salts. While the natural juice solids may contain acids, the amount of acids from the natural juice solids cannot constitute greater than 15% by weight of the dried acidulent. Higher amounts of acids from the natural juice solids results in spray drying difficulties. Certain of the lipids, proteins and/or carbohydrates in the natural juice solids act as natural surfactants. The amounts of natural surfactants must be sufficient to wet the hydrophobic fumaric acid.

The acidulent may additionally contain a sweetener employed in a range of at least 2% and preferably from 3% to 25% based upon the weight of the final acidulent product. The sweetener will function in the acidulent to sweeten and improve wettability. The preferred sweetener is corn syrup. The most preferred sweetener is high fructose corn syrup. As is well known in the art, high fructose corn syrup contains greater than 95% monosaccharides.

The acidulent of the present invention is preferably prepared by spray-drying an aqueous suspension comprising fumaric acid and natural juice solids. Spray-drying transforms the aqueous suspension feed into a dry powder which may be a continuous one step operation. The drying operation may consist of: atomization of the feed suspension into a spray by the use of a vaned wheel rotating at high speed; contacting of the spray with hot air to promote evaporation (the hot air enters a chamber around the atomizer vaned wheel); and separating the dried product from the air in a cyclone. The basic principles involved concern the atomization of the feed liquid into a spray of very small droplets. These droplets have a very large surface area and evaporation is completed rapidly. The necessary small droplet sizes are produced by rotating the vaned wheel at high speeds. The resulting evaporation rates are high enough to remove sufficient moisture from the droplets. The final acidulent product will have a moisture content of approximately 1% to 5%. During the evaporation stage, there is an accompanying cooling effect on the droplets. Since the product residence time during drying is short, heat damage of the product is prevented.

Suitably, fumaric acid in an aqueous suspension is fed to a spray drier. The concentration of fumaric acid in the aqueous suspension will range from 10 to 65% by weight and preferably 20 to 45% by weight. The juice solids are also present in the suspension at a concentration within the range of 4% to 40% by weight and preferably from 4% to 30% by weight. The suspension may be made by combining fumaric acid with an appropriate natural juice or mixture or juices thereof to form a suspension. The suspension may also be formed by combining fumaric acid, juice concentrate and adding additional water to form suitable concentrations of the fumaric acid in natural juice solids. The fumaric acid added to the suspension generally is in powdered form and has a particle size ranging from about 10 to about 100 microns.

When juice concentrates are employed, suitably the juice concentrate is first diluted with suitable amounts of water and then combined with the fumaric acid and mixed to form a suspension. Optionally one or more sweeteners may be added to the suspension. When sweetners are employed, the amount of juice solids may be decreased. However, the amount of juice solids in the final product cannot decrease below about 5%. When the sweeteners are employed they are used in an amount from 1% to 15% of the suspension and preferably from 1% to 10%.

The suspension is fed to the spray dryer, atomized and dried by contact with a hot gas, preferably hot air, as described previously. Suitably the hot air inlet temperatures range from 105° C. to 170° C. and preferably from 120° C. to 150° C. The outlet temperatures range from approximately 70° C. to approximately 95° C. The suspension inlet temperature generally is ambient temperature and may range from approximately 20° C. to about 45° C. The dried powdered acidulent outlet temperature varies from 50° C. to 70° C.

As will be apparent to those skilled in the art, the combination of fumaric acid and natural juice solids could also be drum dried or freeze dried. However, the most economical process is spray-drying and this process is thereby preferred.

The dried powdered acidulent formed generally has a particle size ranging from 10 to 100 microns and preferably has a particle size ranging from 10 to 60 microns.

The dried products formed by the present invention may be employed as an acidulent in a wide variety of powdered fruit drinks and powdered dessert products, for example TANG TM and KOOL-AID TM powdered beverage mixes and JELL-O TM gelatin desserts. The acidulent of the present invention may replace all or part of the citric acid or other acidulents normally employed in these products. When the dry product is employed in a product system, it normally is used in an amount from 2% to 80% based on a dry product mix and from 0.05% to 2% on the as-consumed basis when the dry product mix is reconstituted with water.

It is found that when a dry product mix using the acidulent of the present invention is added to water, the powdered mixture with the acidulent rapidly dissolved into the water even if the water is cold, for example 4° C.

Furthermore, it has been found that depending on the type of juice employed, a natural color may be imparted to the acidulent by the juice component. For example strawberry adds a characteristic red strawberry color, lemon has a characteristic yellow color, orange will have a characteristic orange color, cranberry will have a characteristic red color, beets will have a characteristic red color, and so on. Thus, when the acidulent is formed with fumaric acid and these natural juices, the acidulent also acts as a colorant as well as an acidulent. If, however, an acidulent with little or no coloring is desired, then grapefruit, white grapes or pears are employed, or the natural juice may be decolorized prior to its combination with fumaric acid.

The following Examples are presented to further illustrate the invention, but it is understood that the invention is not to be limited to the details of the Examples herein.

EXAMPLES 1-9

The following examples were prepared by first forming a suspension of fumaric acid, juice and water. The suspension was then fed at a rate of 15 ml/min. in conjunction with cross flow hot air at a rate of 40 cu. ft. per minute to a Niro spray dryer (Mobile Minor Unit, manufactured by Niro Atomizer, Ltd., Copenhagen, Denmark). The concentration of juice and fumaric acid in the suspension, their percentage in the dried product and the spray dryer conditions are set forth in Table 1.

TABLE I

PREPARATION OF FUMARIC ACID/JUICE SOLIDS ACIDULENT VIA SPRAY-DRYING

| | Fruit Juice Used | | | Fumaric | | Hot Air | Hot Air | Dried Product | | |
|---|---|---|---|---|---|---|---|---|---|---|
| Example | Type | Brix (°) | Juice Weight (g) | Acid Weight (g) | Water Added (g) | Inlet Temperature (C.°) | Outlet Temperature (C.°) | Fruit Solids (%) | Fumaric Acid (%) | Color |
| 1 | Grapefruit | 40 | 150 | 140 | 250 | 135 | 90 | 30 | 70 | white |
| 2 | Strawberry | 8 | 500 | 200 | 00 | 150 | 90 | 17 | 83 | peach-pink |
| 3 | Lemon | 51 | 15 | 150 | 300 | 150 | 90 | 5 | 95 | bone white |
| 4 | Orange | 50 | 15 | 150 | 300 | 150 | 90 | 5 | 95 | yellow |
| 5 | Orange | 50 | 30 | 150 | 300 | 150 | 90 | 9 | 91 | yellow |
| 6 | Orange | 50 | 90 | 150 | 300 | 150 | 90 | 23 | 77 | yellow |
| 7 | Orange | 65 | 138 | 210 | 550 | 130 | 90 | 30 | 70 | yellow |
| 8 | Cranberry | 50 | 30 | 150 | 300 | 120 | 95 | 9 | 91 | red |
| 9 | Beets | 10 | 200 | 133 | 400 | 140 | 85 | 13 | 87 | magenta |

It was found that when the products made by these examples were put in cold water they readily dissolved in cold water without floating on the top or settling to the bottom of the container.

EXAMPLES 10–13

In the following examples, an orange-flavored powdered beverage mix comprising sugar, citric acid and natural orange flavor was prepared. In three of the examples part of the citric acid was replaced with acidulents of the instant invention as set forth in Table II. It was found in all the examples that the resulting orange-flavored beverage product was tart and free from sediment either floating on the surface or settling to the bottom of the beverage container.

TABLE II

UTILIZATION OF FUMARIC ACID/ORANGE JUICE ACIDULENT AS A PARTIAL REPLACEMENT FOR A SUGAR-SWEETENED ORANGE POWDER DRINK

| | Fumaric Acid/Fruit Juice Solids Acidulent | | | Citric Acid Level in Powdered Orange Mix (%) | Degree of Replacement of Citric Acid by Fumaric Acid (%) | Wt. of Fumaric Acid (dry basis) (%) |
|---|---|---|---|---|---|---|
| Example | Fumaric (%) | Orange Juice Solids (%) | High Fructose Corn Syrup Solids (%) | | | |
| 10 | Control, no fumaric acid/juice acidulent | | | 5.30 | 0.0 | 0.0 |
| 11 | 94.9 | 5.1 | 0.0 | 4.24 | 20.0 | 0.74 |
| 12 | 68.1 | 24.3 | 7.6 | 4.24 | 20.0 | 0.74 |
| 13 | 85.1 | 9.8 | 5.1 | 2.65 | 50.0 | 1.86 |

We claim:

1. A co-dried particulate acidulent comprising fumaric acid in an amount of at least 50% by weight and natural juice solids in an amount of at least 5% by weight.

2. A co-dried particulate acidulent according to claim 1 wherein the amount of fumaric acid is from 50% to 95% by weight.

3. A co-dried particulate acidulent according to claim 1 wherein the amount of natural juice solids are from 5% to 50%.

4. A co-dried particulate acidulent according to claim 1 further comprising the addition of a sweetener in an amount of at least 2% by weight.

5. A co-dried particulate acidulent according to claim 4 wherein the sweetener is a corn syrup.

6. A co-dried particulate acidulent according to claim 5 wherein the corn syrup is high fructose corn syrup.

7. A co-dried particulate acidulent according to claim 4 wherein the sweetener is added in an amount of from 3% to 25% by weight.

8. A co-dried particulate acidulent according to claim 1 wherein the natural juice solids are fruit juice solids.

9. A co-dried particulate acidulent according to claim 1 wherein the natural juice solids are vegetable juice solids.

10. A co-dried particulate acidulent as claimed in claim 1 wherein said acidulent has a particle size in the range from about 10 to about 100 microns.

11. A co-dried particulate acidulent as claimed in claim 10 wherein said particle range is from about 10 to about 60 microns.

12. A method of improving the wettability and solubility of fumaric acid by spray drying a suspension of fumaric acid and natural juice solids to produce a particulate acidulent comprising fumaric acid in an amount of at least 50% by weight and dried natural juice solids in an amount of at least 5% by weight.

13. A method according to claim 12 wherein the amount of fumaric acid in the suspension is from 10% to 65% by weight.

14. A method according to claim 12 wherein the juice solids in the suspension are from 4% to 40% by weight.

15. A method according to claim 14 wherein the suspension further comprises a sweetener at a level sufficient to produce an acidulent comprising the sweetener in amount of at least 2% by weight.

16. A method according to claim 15 wherein the sweetener is a corn syrup.

17. A method according to claim 15 wherein the sweetener is high fuctose corn syrup.

18. A method according to claim 15 wherein the sweetener in the suspension is present in an amount of from 1% to 15%.

19. A powdered beverage mix having incorporated therein the co-dried particulate acidulent of claim 1.

20. A powdered beverage mix according to claim 19 wherein the acidulent is incorporated in an amount of from 2% to 80% based upon the total weight of the powdered beverage mix.

21. A powdered gelatin dessert mix having incorporated therein the co-dried particulate acidulent of claim 1.

* * * * *